United States Patent
Hachtmann (10) Patent No.: US 9,353,792 B2
(45) Date of Patent: May 31, 2016

(54) BIASED COMPOUND RADIAL PLAIN BEARING FOR INCREASED LIFE IN OSCILLATING PIVOT MOTION

(71) Applicant: Google Inc., Mountain View, CA (US)

(72) Inventor: Brian Hachtmann, San Martin, CA (US)

(73) Assignee: Google Inc., Mountain View, CA (US)

( * ) Notice: Subject to any disclaimer, the term of this patent is extended or adjusted under 35 U.S.C. 154(b) by 59 days.

(21) Appl. No.: 14/184,026

(22) Filed: Feb. 19, 2014

(65) Prior Publication Data

US 2015/0233419 A1  Aug. 20, 2015

(51) Int. Cl.
| | |
|---|---|
| *F16C 17/00* | (2006.01) |
| *F16C 17/18* | (2006.01) |
| *F16C 17/24* | (2006.01) |
| *F16C 23/04* | (2006.01) |
| *F16C 41/00* | (2006.01) |

(52) U.S. Cl.
CPC ............... *F16C 17/18* (2013.01); *F16C 17/246* (2013.01); *F16C 23/045* (2013.01); *F16C 41/001* (2013.01)

(58) Field of Classification Search
CPC ........ F16C 17/00; F16C 17/18; F16C 23/043; F16C 25/04; F16C 41/001; F16C 2300/20; F16C 2300/28
See application file for complete search history.

(56) References Cited

U.S. PATENT DOCUMENTS

| | | | | |
|---|---|---|---|---|
| 2,647,807 | A | * | 8/1953 | Brunstrum ..................... 384/461 |
| 3,025,114 | A | * | 3/1962 | Beecher ........................ 384/461 |
| 3,279,721 | A | * | 10/1966 | Dethman ......................... 244/46 |
| 3,439,964 | A | | 4/1969 | Stone et al. |
| 3,510,178 | A | | 5/1970 | Sowatzke |
| 3,669,514 | A | * | 6/1972 | Wada et al. .................... 384/112 |
| 4,184,720 | A | * | 1/1980 | Zacherl ......................... 384/109 |
| 4,319,788 | A | | 3/1982 | Hackman |
| 5,056,938 | A | * | 10/1991 | Ahlman et al. ............... 384/286 |
| 5,676,468 | A | | 10/1997 | Webb |
| 6,325,544 | B1 | | 12/2001 | Sasaki et al. |
| 7,658,546 | B2 | | 2/2010 | Clarke et al. |
| 8,485,332 | B2 | | 7/2013 | Shirataki et al. |
| 8,529,133 | B2 | | 9/2013 | Oppliger et al. |
| 8,556,515 | B2 | | 10/2013 | Kuwabara et al. |
| 8,556,519 | B2 | | 10/2013 | Bohr et al. |
| 8,616,304 | B2 | | 12/2013 | Scott et al. |
| 2011/0255812 | A1 | | 10/2011 | Connell et al. |

FOREIGN PATENT DOCUMENTS

EP  1837534 A2  3/2007

* cited by examiner

*Primary Examiner* — Thomas R. Hannon
(74) *Attorney, Agent, or Firm* — McDonnell, Boehnen, Hulbert & Berghoff LLP (57) ABSTRACT

Exemplary embodiments disclosed herein include bearings with three races: an inner race, a shared race, and an outer race that exhibit increased life under oscillatory loads. The exemplary embodiments may include one or more directional biasing mechanisms configured such that when a bearing shaft rotates in one direction, the shared race rotates with it, and when the shaft oscillates in the other direction, the shared race is impeded from moving in the other direction. Under continued oscillation, the shared race will "walk" in circles around the shaft, effectively distributing the load and wear over the entire circumference of a bearing surface.

17 Claims, 7 Drawing Sheets

--Prior Art--

--Prior Art--

BIASED COMPOUND RADIAL PLAIN BEARING FOR INCREASED LIFE IN OSCILLATING PIVOT MOTION

BACKGROUND

Unless otherwise indicated herein, the materials described in this section are not prior art to the claims in this application and are not admitted to be prior art by inclusion in this section.

Radial bearings generally provide free rotation around a fixed axis. Radial spherical bearings may generally provide free rotation about a pivoting axis. In applications where a radial bearing experiences oscillatory movements under high load, wear and failure of the bearing may be greatly accelerated as compared to a bearing in a similarly loaded but fully rotational application.

SUMMARY

Compound radial bearings are described herein. More specifically, example embodiments generally relate to plain radial compound bearings and plain radial spherical compound bearings. Beneficially, embodiments described herein may increase the life of bearings that experience sustained oscillatory loads.

In one aspect, an example compound spherical plain bearing comprises (i) an inner race comprising an external convex first bearing surface; (ii) a shared race comprising (1) an inner concave second bearing surface circumscribing a lateral portion of the first bearing surface and in sliding disposition to the first bearing surface, and (2) an outer flat third bearing surface; and, (iii) an outer race enclosing at least part of an outer periphery of the shared race, the outer race comprising an inner flat fourth bearing surface circumscribing a lateral portion of the third bearing surface and in sliding disposition to the third bearing surface.

In another aspect, an example compound spherical plain bearing comprises: (i) an inner race comprising an external flat first bearing surface; (ii) a shared race comprising (1) an inner flat second bearing surface circumscribing a lateral portion of the first bearing surface and in sliding disposition to the first bearing surface, and (2) an outer convex third bearing surface; and, (iii) an outer race comprising an inner concave fourth bearing surface circumscribing a lateral portion of the third bearing surface and in sliding disposition to the third bearing surface.

In a further aspect, an example compound radial plain bearing comprises: (i) an inner race comprising an external flat first bearing surface; (ii) a shared race comprising (1) an inner flat second bearing surface circumscribing a lateral portion of the first bearing surface and in sliding disposition to the first bearing surface, and (2) an outer flat third bearing surface; and, (iii) an outer race comprising an inner flat fourth bearing surface circumscribing a lateral portion of the third bearing surface and in sliding disposition to the third bearing surface.

These as well as other aspects, advantages, and alternatives, will become apparent to those of ordinary skill in the art by reading the following detailed description, with reference where appropriate to the accompanying drawings.

DETAILED DESCRIPTION

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed methods systems and can be arranged and combined in a wide variety of different configurations, all of which are contemplated herein.

I. Overview

A primary cause of radial bearing wear is the result of loads placed into the bearing from a rotating shaft. In configurations with a standard radial bearing, one of the worst case scenarios for premature wear is when the bearing is used on a radially oscillating shaft, as opposed to a shaft that continuously spins through full revolutions. When one race of a standard bearing spins through its full range of motion relative to the other race, the load from the shaft may be spread across the full circumference of one or both of the races, depending on the configuration and style of the bearing. As a result, the wear may also be distributed across the circumference of one or both of the bearing races. However, when a shaft oscillates it may cause the inner race to move within only a fixed range relative to the outer race. Under such conditions, the wear may be concentrated within only a narrow range of the one or both of the races' circumferences, resulting in premature failure of the bearing.

To solve that problem, exemplary embodiments disclosed herein may include bearings with three races: an inner race, a shared race, and an outer race. The exemplary embodiments may further include one or more directional biasing mechanisms configured such that when a bearing shaft rotates in one direction, the shared race rotates with it, and when the shaft rotates in an opposite direction, the shared race is impeded from moving in the other direction. Under continued oscillation, the shared race will consequently "walk" in a circle around the shaft, effectively distributing the load and wear over the entire circumference of the bearing surface(s). In the case of a 30° oscillation range, the life of the bearing may increase up to twelve-fold due to the walking motion (360° rotation/30° oscillation=12 times the effective wear surface of a standard bearing) and up to another two-fold because each surface may only see one of the two oscillation movements (in each rotation direction, only one surface is moving and therefore wearing; the other surface is relatively stationary and therefore does not wear, or wears less). Beneficially, the bearings disclosed herein may provide a longer lifespan than known bearings and, for an exemplary 30° oscillation, may last up to 24 times longer than standard radial bearings. Such long life bearings may be extremely beneficial in applications which require low-maintenance and which exhibit long periods of oscillatory loads.

Example embodiments of bearings disclosed herein generally relate to radial plain bearings, but may include roller bearings and other types of bearings. The bearings may function as standard radial bearings, spherical bearings, taper bearings, and other known radial or semi-radial configurations.

In one exemplary embodiment, the inner race may include an inner shaft bore and an external convex first bearing surface. The shared race may include an inner concave second bearing surface that circumscribes a lateral portion of the first bearing surface and is in sliding disposition to the first bearing surface. The shared race may further include an outer flat third bearing surface. The outer race may enclose at least part of an outer periphery of the shared race and may include an inner flat fourth bearing surface that circumscribes a lateral portion of the third bearing surface and is in sliding disposition to the third bearing surface.

Additionally, the bearing may further include a first directional jamming mechanism that is configured to allow the inner race to rotate in a first radial direction relative to the shared race and to impede (including preventing) rotation of the inner race relative to the shared race in a second radial direction. The second radial direction may be opposite to the first radial direction. Further, the bearing may include a second directional jamming mechanism configured to allow the shared race to rotate in the second radial direction relative to the outer race and to impede (including preventing) rotation of the shared race in the first radial direction relative to the outer race.

In another exemplary embodiment, the inner race may include an inner shaft bore and an external flat first bearing surface. The shared race may include an inner flat second bearing surface that circumscribes a lateral portion of the first bearing surface and is in sliding disposition to the first bearing surface. The shard race may further include an outer convex third bearing surface. The outer race may include an inner concave fourth bearing surface that circumscribes a lateral portion of the third bearing surface and is in sliding disposition to the third bearing surface.

Additionally, the bearing may further include a first directional jamming mechanism configured to allow the inner race to rotate in a first radial direction relative to the shared race and to impede (including preventing) rotation of the inner race relative to the shared race in a second radial direction. The second radial direction may be opposite to the first radial direction. Further, the bearing may include a second directional jamming mechanism configured to allow the shared race to rotate in the second radial direction relative to the outer race and to impede (including preventing) rotation of the shared race in the first radial direction relative to the outer race.

II. Standard Radial Bearings

Figure 1A:
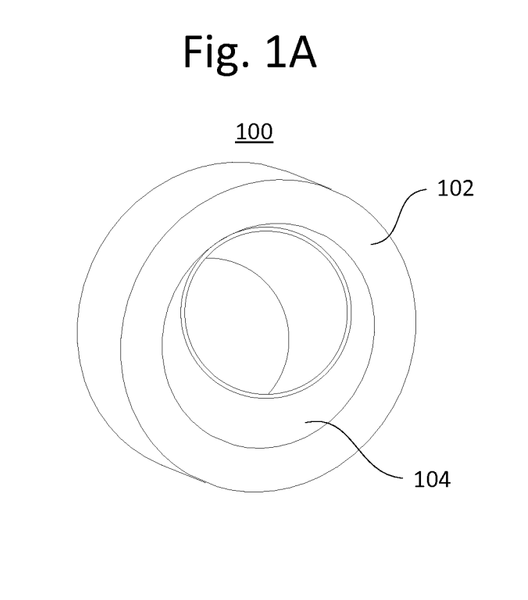
FIGS. 1A-C depict a standard spherical bearing.
Figure 1B:
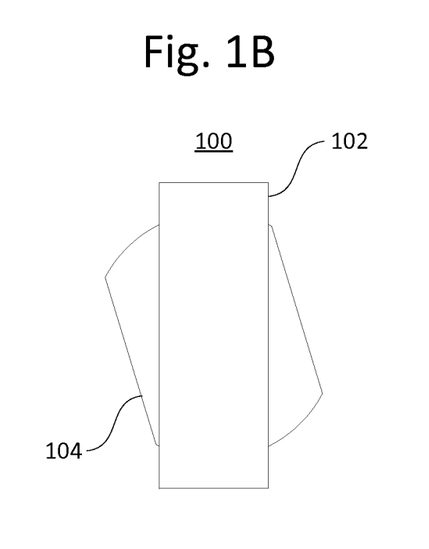
Figure 1C:
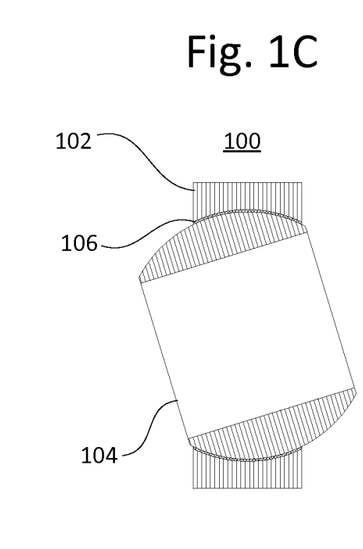

Referring now to FIGS. 1A-1C, FIGS. 1A and 1B illustrate a standard spherical bearing 100, including an outer race 102 and an inner race 104. FIG. 1C illustrates a cross-section of bearing 100. The standard spherical bearing may further include a lubricant layer 106.

Figure 2A:
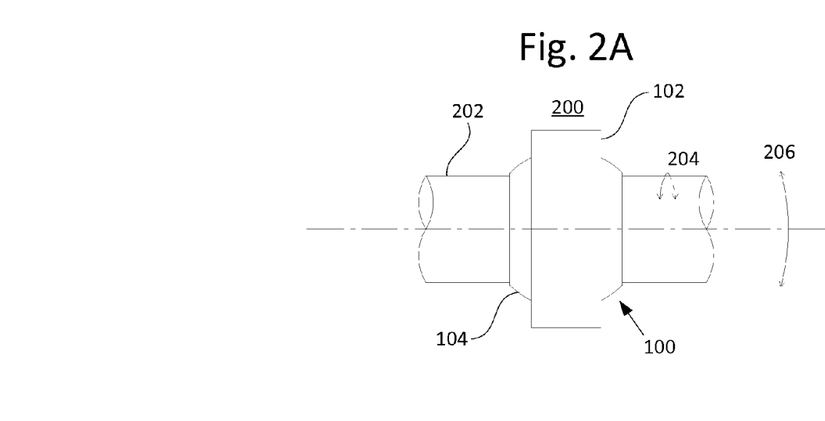
FIGS. 2A and 2B depict a standard spherical bearing and shaft.
Figure 2B:
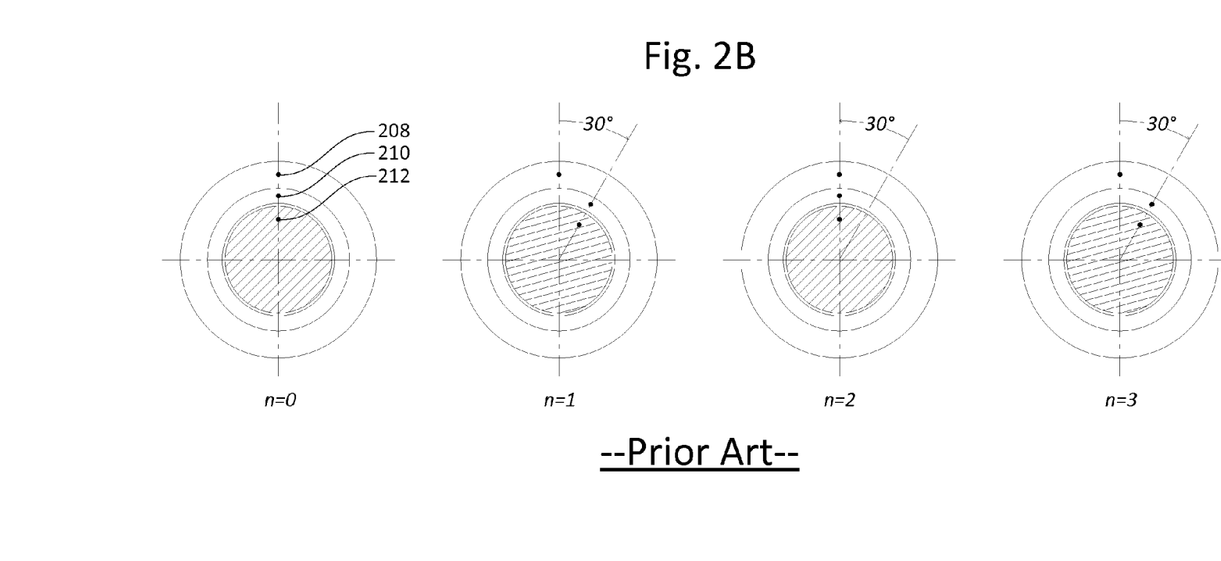

FIG. 2A illustrates a shaft and standard bearing assembly 200 that includes a standard spherical bearing 100 and a shaft 202 fixed to the inner race 104. The shaft 202 and inner race 104 may rotate in a radial direction 204 and may also pivot in an angular direction 206. FIG. 2B illustrates an oscillation condition for assembly 200 that can lead to accelerated wear for the standard bearing 200. Tick marks 208, 210, and 212 represent rotational positions of the outer race 102, inner race 104, and shaft 202, respectively, and are used for illustrative purposes only. Designations n=0 through n=3 represent successive time intervals through an oscillation cycle of assembly 200. At n=0, the assembly is at an initial condition. At n=1, the shaft 202 (and correspondingly the inner race 104) have completed the first movement of a 30° oscillation in a clockwise direction. At n=2, the shaft 202 and inner race 104 have completed the second (i.e., return) movement of the 30° oscillation in the opposite, counter-clockwise direction. At n=3, the shaft 202 and inner race 104 again rotate 30° clockwise. Such oscillations may be continued ad infinitum. In this common example, a radial load placed onto the shaft during the oscillation would cause accelerated wear within a 30° arc of the circumference of the inner/outer race interface, with the radial location of the wear arc along the circumference dependent on the relative location of the radial load. This may be particularly problematic for bearing applications that call for high loading with slow oscillatory movement, such as, for example, applications with recurring patterns and that may rely on light-weight spherical plain bearings to accommodate loads with continuous radial oscillations.

III. Illustrative Radial Bearings

The present embodiments disclosed herein advantageously may provide longer life than the standard spherical plain bearing 100 illustrated in FIGS. 1A through 2B, particularly when used in high load, slow oscillation applications. The arrangements described herein may therefore beneficially provide very long life bearings requiring little or no maintenance.

Figure 3A:
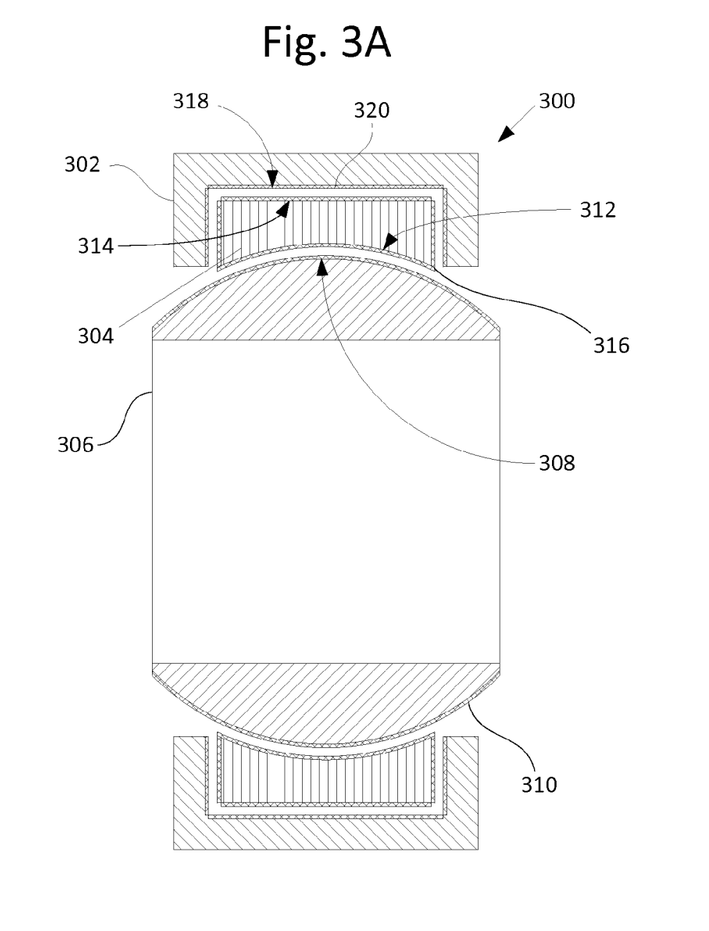
FIG. 3A depicts a bearing, according to an example embodiment.
Figure 3B:
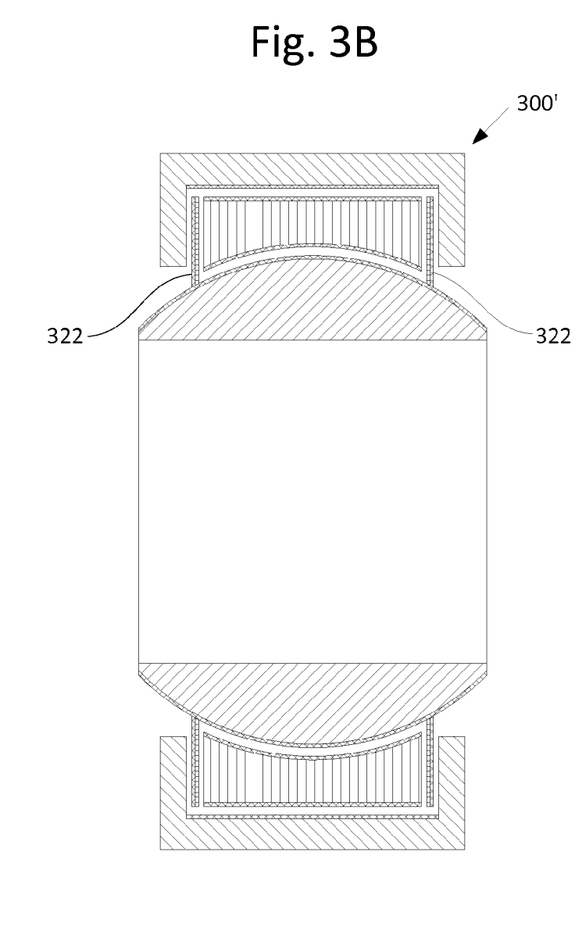
FIG. 3B depicts a bearing, according to an example embodiment.
Figure 4:
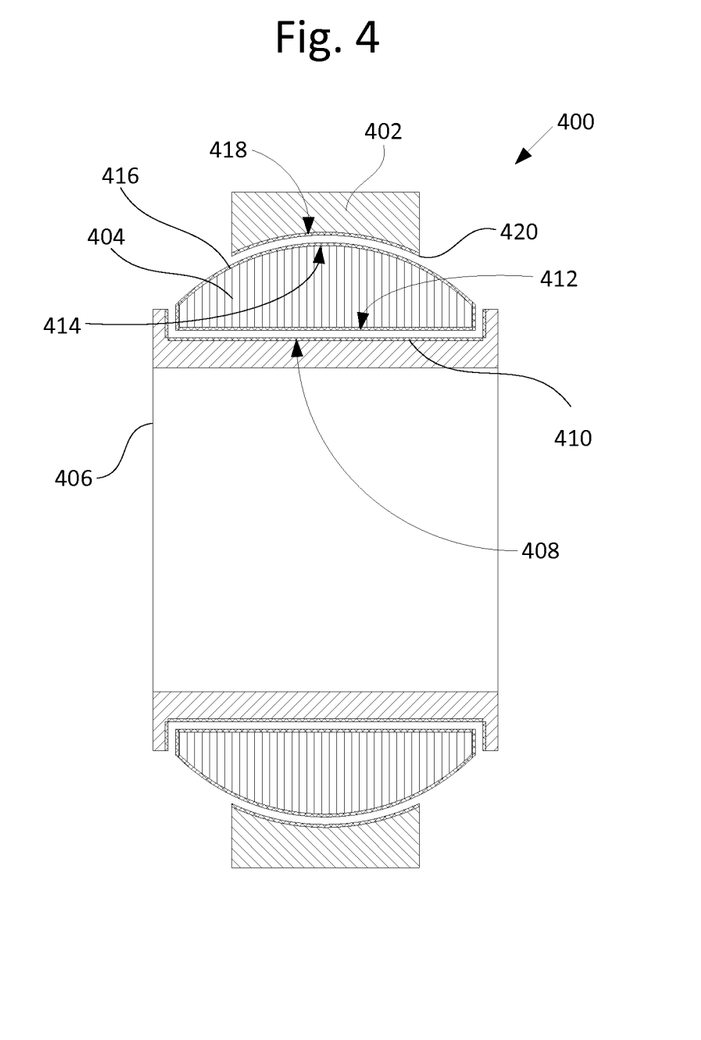
FIG. 4 depicts a bearing, according to an example embodiment.

FIG. 3A illustrates a compound radial plain bearing 300, capable of operating as a spherical bearing according to an exemplary embodiment. The bearing 300 may include a spherical inner race 306, a flat (e.g., cylindrical) outer race 302, and a shared race 304. (Note that the large gaps between the races for FIGS. 3A through 4 are shown for the ease of illustration only and any such gaps in practice preferably conform to industry standards for plain bearing types.) The inner race 306 may include an external convex bearing surface 308 which may substantially conform to an inner concave bearing surface 312 of the shared race 304. The concave bearing surface 312 of the shared race 304 may capture the inner race 306 by circumscribing a lateral (i.e., width-wise in cross-section) portion of the inner race's convex bearing surface 308, while still allowing the surfaces to slide against each other. In that manner, the inner race 306 may both pivot and rotate radially within the shared race 304.

The shared race 304 may further include an outer flat (e.g., cylindrical) bearing surface 314. The outer race 302 may capture the shared race 304 by, for example, enclosing at least part of an outer periphery of the shared race 304, including the bearing surface 314. As an example, the outer race 302 may include an inner flat (e.g., cylindrical) bearing surface 318 that circumscribes a lateral (i.e., width-wise in cross-section) portion of the shared race's flat bearing surface 314, while still allowing the surfaces to slide against each other. In that manner, the shared race 304 may rotate radially within the outer race 302.

To reduce friction between the inner race 306 and the shared race 304, and between the shared race 304 and outer race 302, a lubricating layer may be disposed between the respective race interfaces. For example, any or all of the interfacing surfaces 308, 312, 314, and/or 318 may be self-lubricating, and optionally softer, bearing wear surfaces, such as lubricated porous sintered metal, impregnated metal (e.g., polytetrafluoroethylene impregnated steel), or plastic. Additionally or alternatively, any or all of the interfacing surfaces 308, 312, 314, and/or 318 may be hard (including hardened)

bearing surfaces, such as hardened steel. In a preferable compound bearing configuration, the bearing surfaces 312 and 314 of shared race 304 may be wear surfaces and bearing surfaces 308 and 318 of inner and outer races, respectively, may be hardened surfaces.

As another example, all or portions of any of the interfacing surfaces 308, 312, 314, and/or 318 may include optional lubricating liners 310, 316, 320. Preferably, only one liner would be present for each pair of interface surfaces. Also preferably, the liner will be part of the shared race. As an example, at the interface between bearing surfaces 308 and 312, it is preferable that only liner 316 is present, and that bearing surface 308 does not include a liner 310. Further, at the interface between bearing surfaces 314 and 318, it is preferable that only liner 316 is present at that interface, and that bearing surface 318 does not include a liner 320. For purposes herein, the lubricating liners 310, 316, 320 may be considered either part of their respective races 306, 304, and 302, or as physically separate elements.

The liners 310, 316, 320 may consist of nylon polyamide, polyester, glass, or polytetrafluoroethylene (PTFE) fibers, or other base materials. Further, the liners 310, 316, 320 may be impregnated with PTFE particles and/or other lubricating materials. Further, the liners may include optionally bonded backing materials such as steel, bronze, or aluminum. Other liner materials are also possible. The liners 310, 316, 320 may not cover the entirety of any given bearing surface 308, 312, 318 (as shown in FIG. 3A), may alternatively cover only a portion of a given bearing surface 308, 312, 318, and/or may exist in multiple parts. For example, liner 316 may compose two discrete lateral portions, each covering a lateral section of the bearing surface 312 along the entire circumference of the bearing surface 312.

In a preferred PTFE liner system, the PTFE in the liner acts as the lubricant. When the bearing 300 is operated, the pressure and movement of the opposing races shears PTFE from the liners. As the bearing 300 operates, the PTFE may be burnished into the bearing surfaces and also into the liner surfaces, thereby reducing the coefficient of friction. After the coefficient of friction becomes sufficiently low, no further PTFE may be sheared from the liner. If through continued use, some PTFE on the surfaces exits the bearing, friction may increase and more PTFE may be sheared from the liner and may be deposited on the bearing surfaces and liner surfaces.

FIG. 3B reflects another compound radial plain bearing 300' that is similar to the bearing 300 illustrated in FIG. 3A, and likewise capable of operating as a spherical bearing according to an exemplary embodiment. Bearing 300' further includes thrust washers 322 that may assist in retaining, or serve to retain, one or more of the races in relation to each other. Furthermore, the thrust washers 322 may include a lubricating portion, such as the liners described above with respect to FIG. 3A.

In another exemplary embodiment, FIG. 4 illustrates a compound radial plain bearing 400, capable of operating as a spherical bearing according to an exemplary embodiment. The bearing 400 may include a flat (e.g., cylindrical) inner race 406, an outer race 402, and a shared race 404. The inner race 406 may include an external flat (e.g., cylindrical) bearing surface 408 which may substantially conform to an inner flat (e.g., cylindrical) bearing surface 412 of the shared race 404. The shared race 404 may capture the inner race 406 by, for example, enclosing at least part of an outer periphery of the inner race 406, including the bearing surface 408. As an example, the bearing surface 412 may circumscribes a lateral (i.e., width-wise in cross-section) portion of the inner race's bearing surface 408, while still allowing the surfaces to slide against each other. In that manner, the inner race 406 may rotate radially within the shared race 404.

The shared race 404 may further include an outer convex bearing surface 414. A concave bearing surface 418 of the outer race 402 may capture the shared race 404 by circumscribing a lateral (i.e., width-wise in cross-section) portion of the shared race's convex bearing surface 414, while still allowing the surfaces to slide against each other. In that manner, the shared race 404 may both pivot and rotate radially within the outer race 402.

Similarly to bearing 300, a lubricating layer may be disposed between the respective race interfaces of bearing 400. For example, any or all of the interfacing surfaces 408, 412, 414, and/or 418 may be self-lubricating, and optionally softer, bearing wear surfaces, such as lubricated porous sintered metal, impregnated metal (e.g., polytetrafluoroethylene impregnated steel), or plastic. Additionally or alternatively, any or all of the interfacing surfaces 408, 412, 414, and/or 418 may be hard (including hardened) bearing surfaces, such as hardened steel. In a preferable compound bearing configuration, the bearing surfaces 412 and 414 of shared race 404 may be wear surfaces and bearing surfaces 408 and 418 of inner and outer races, respectively, may be hardened surfaces.

As another example, all or portions of any of the interfacing surfaces 408, 412, 414, and/or 418 may include optional lubricating liners 410, 416, 420. Preferably, only one liner would be present for each pair of interface surfaces. Also preferably, the liner will be part of the shared race. As an example, at the interface between bearing surfaces 408 and 412, it is preferable that only liner 416 is present, and that bearing surface 408 does not include a liner 410. Further, at the interface between bearing surfaces 414 and 418, it is preferable that only liner 416 is present at that interface, and that bearing surface 418 does not include a liner 420. For purposes herein, the lubricating liners 410, 416, 420 may be considered either part of their respective races 406, 404, and 402, or as physically separate elements.

The liners 410, 416, 420 may consist of nylon polyamide, polyester, glass, or polytetrafluoroethylene (PTFE) fibers, or other base materials. Further the liners 410, 416, 420 may be impregnated with PTFE particles and/or other lubricating materials. Further, the liners may include optionally bonded backing materials such as steel, bronze, or aluminum. Other liner materials are also possible. The liners 410, 416, 420 may not cover the entirety of any given bearing surface 408, 412, 418 (as shown in FIG. 4), may alternatively cover only a portion of a given bearing surface 408, 412, 418, and/or may exist in multiple parts. For example, liner 418 may compose two discrete lateral portions, each covering a lateral section of the bearing surface 418 along the entire circumference of the bearing surface 418.

Figure 7:
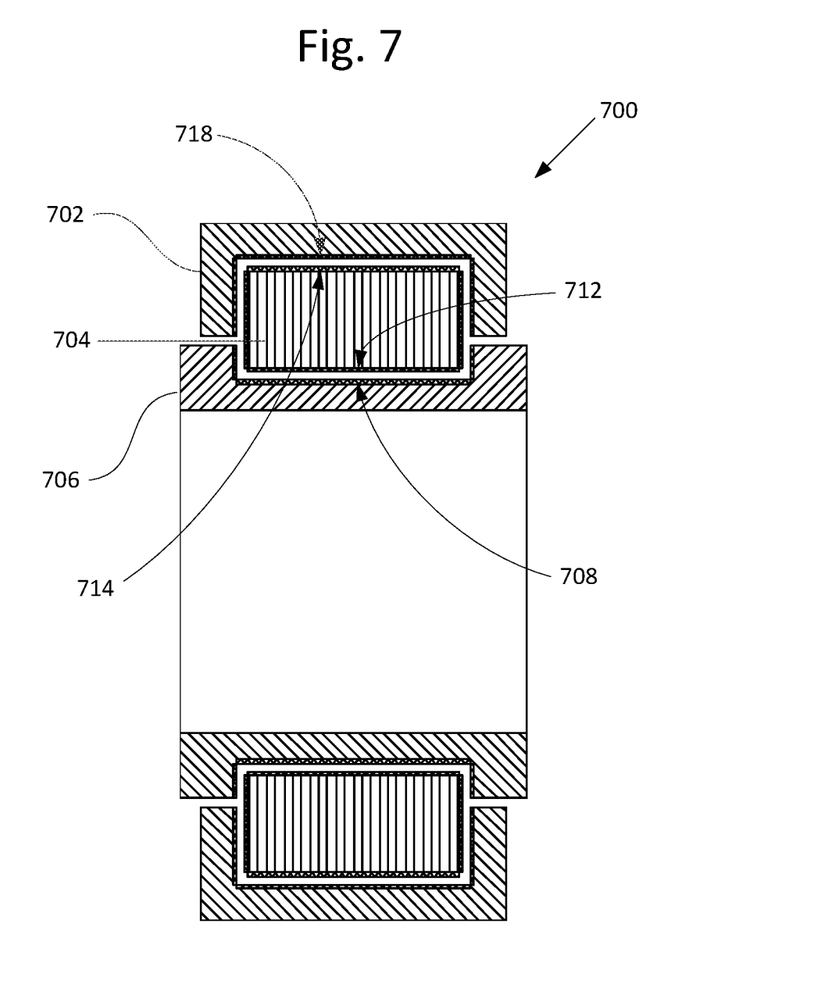
FIG. 7 depicts a bearing, according to an example embodiment.

In addition to the compound bearings disclosed in relation to FIGS. 3A, 3B, and 7, other beneficial bearing configurations are also possible and this disclosure should not be construed to limit the possible bearing configurations to compound radial bearings comprising a plain spherical bearing portion and a plain radial bearing portion. For example, a compound radial plain bearing may comprise two flat (e.g., cylindrical) radial plain bearing portions, or a flanged bearing and a spherical or radial bearing. Additionally or alternatively, the compound bearings should not be limited to plain bearings, and may include roller bearings and other types of bearings.

Additionally and preferably, the compound bearing embodiments described herein may also have a directional biasing mechanism that improves the ability of, or causes, a shared race to "walk" around the bearing in response to oscillation of the inner race. For example, a directional jamming mechanism might act on the inner and shared races. Alternatively or additionally, a directional jamming mechanism might act on the shared and outer races. The directional jamming mechanism may be configured to allow the inner race to rotate in a one radial direction relative to the shared race (e.g., clockwise), and to impede (including prevent) rotation of the inner race relative to the shared race in the other radial direction (e.g., counter-clockwise). Preferably, the latter radial direction is opposite to the former radial direction.

Additionally and preferably, a second directional jamming mechanism might act on the shared and outer races, and in an offsetting manner to the first directional jamming mechanism. For example, the directional jamming mechanism might be configured to allow the shared race to rotate in a one radial direction relative to the outer race (e.g., counter-clockwise), and to impede (including prevent) rotation of the shared race relative to the outer race in the other radial direction (e.g., clockwise). Preferably, the latter radial direction is opposite to the former radial direction.

For plain compound bearings, the directional jamming mechanism may be jamming flexures that are integrally part of the bearing races. As an example, high angle jamming flexures may be formed into portions of one or more of the interfacing bearing surfaces via wire EDM or other methods. Alternatively, the directional jamming mechanism may be one or more jamming flexures that are separate and distinct from the bearing races and disposed between them. As another example, the directional jamming mechanism may be one more biased textures on the bearing surfaces that relatively impede the sliding of the interfacing surfaces in one radial direction. Such textures may be roll formed or otherwise pressed, ground, or turned into the bearing surfaces. For roller compound bearings, a sprag clutch, a sprag clutch bearing set, or similar mechanism may be used. Other configurations are possible as well. The directional jamming mechanisms may act on the optionally present liners, or may act on portions of bearing surfaces where liners are not present.

The embodiments as discussed above with respect to directional jamming mechanisms and FIGS. 3A, 3B, and 4 are applicable to the embodiments discussed below with respect to FIGS. 5 and 6.

Figure 5:
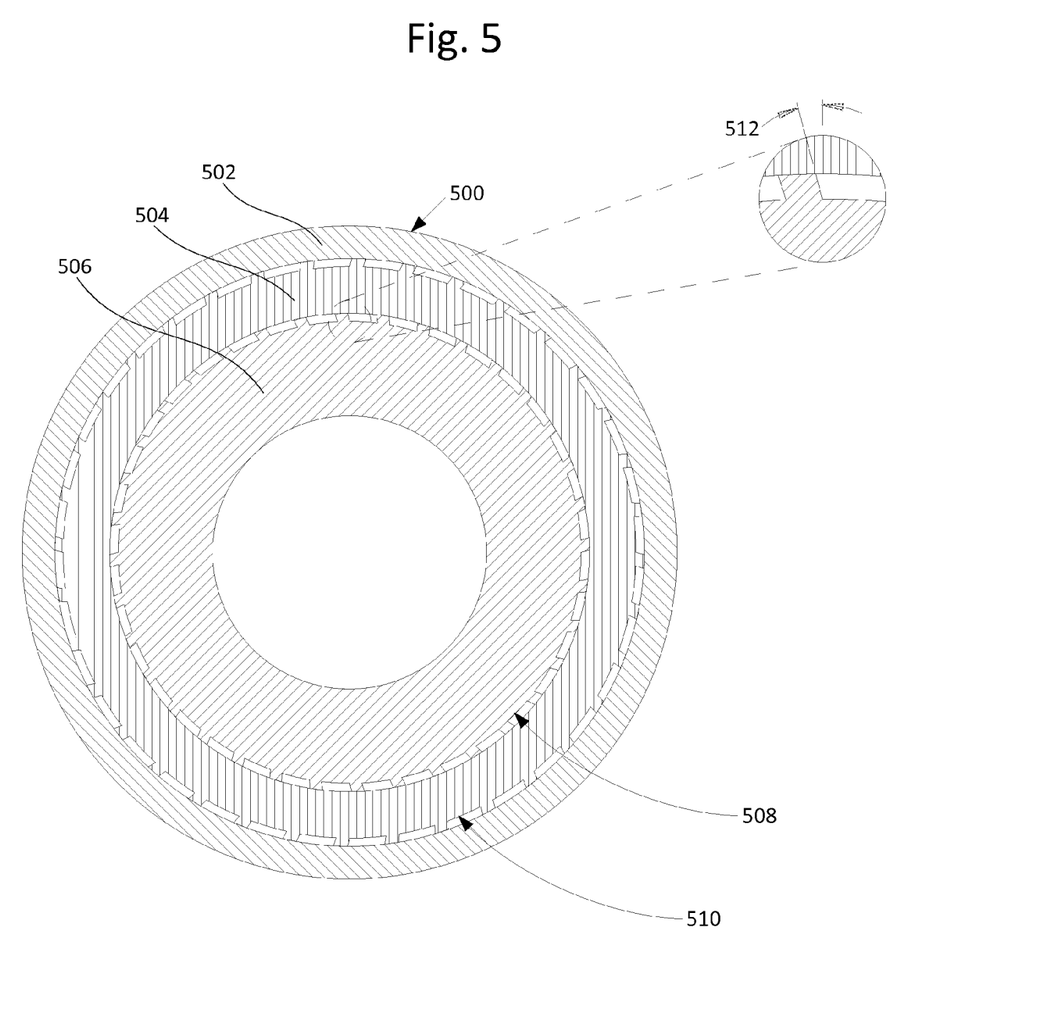
FIG. 5 depicts a bearing, according to an example embodiment.

Referring now to FIG. 5, an exemplary compound bearing, such as bearing 300, bearing 300', bearing 400, and other contemplated compound bearings, is illustrated in cross-section as compound bearing 500. FIG. 5 illustrates one example of a directional biasing mechanism, but is not intended to be limiting as the only biasing mechanism within the claims.

Illustrated in FIG. 5 is a representative cross-sectional view of an outer race 502, a shared race 504, and an inner race 506 of bearing 500. The outer bearing surface of inner race 506 (corresponding to, for example, all or a portion of bearing surfaces 308 or 408) may include a first directional jamming mechanism. Alternately, and not shown, the inner surface of shared race 504 may include the first directional jamming mechanism. In an illustrated example, the directional jamming mechanism is shown as a high angle jamming flexure 508 formed into the outer bearing surface of inner race 506. The flexures extend radially from the inner race 506 and are oriented at a bias angle 512 from a hypothetical radial centerline. The bias angle 512 may be adjusted to suit the material composition of the inner race 506 and the shared race 504 (including any liner that may be present), but shall be greater than an angle of 0 degrees.

As a result of the bias angle, the inner race 506 may rotate in a clockwise direction relative to the shared race 504. However, if the inner race 506 is rotated counter-clockwise, the high angle flexures will bind against the inner bearing surface of the shared race 504, and therefore impede (including prevent) rotation of the inner race 506 relative to the shared race 504. In effect, rotation of the inner race 506 in the counter-clockwise direction may cause the shared race 504 to rotate in the counter-clockwise direction. Alternatively or additionally, and not shown, the inner bearing surface of the shared race 504 may include a surface configuration designed to oppose rotation of the inner race 506 in the counter-clockwise direction relative to the shared race 504. Such a configuration may allow a bias angle greater than the preferred high angle jamming flexure 508 illustrated in FIG. 5. For example, the bias angle 512 may approach 90° and the flexures may bind against opposing structures on the inner bearing surface of shared race 504.

A second directional jamming mechanism is shown with respect to the interface between the shared race 504 and the outer race 502. The outer bearing surface of shared race 504 (corresponding to, for example, all or a portion of bearing surfaces 314 or 414) may include the second directional jamming mechanism. Alternately, and not shown, the inner surface of outer race 502 may include the first directional jamming mechanism. As illustrated, the second directional jamming mechanism is shown as a high angle jamming flexure 510 formed into the outer bearing surface of shared race 504. The flexures extend radially from the shared race 504 and are also oriented at a bias angle from a hypothetical radial centerline, but in the opposite direction of the flexures of the first directional jamming mechanism. The bias angle of the high angle jamming flexure 510 may be adjusted to suit the material composition of the shared race 504 and the outer race 502 (including any liner that may be present), but shall be greater than an angle of 0 degrees.

As a result of the bias angle, he shared race 504 may rotate in a counter-clockwise direction relative to the outer race 502. However, if the shared race 504 is rotated clockwise, the high angle flexures will bind against the inner bearing surface of the outer race 502, and therefore impede (including prevent) rotation of the shared race 504 relative to the outer race 502. Alternatively or additionally, and not shown, the inner bearing surface of the outer race 502 may include a surface configuration designed to oppose rotation of the shared race 504 in the clockwise direction relative to the outer race 502. Such a configuration may allow a bias angle greater than the preferred high angle jamming flexure 510 illustrated in FIG. 5. For example, the bias angle 512 may approach 90° and the flexures may bind against opposing structures on the inner bearing surface of shared race 504.

Figure 6:
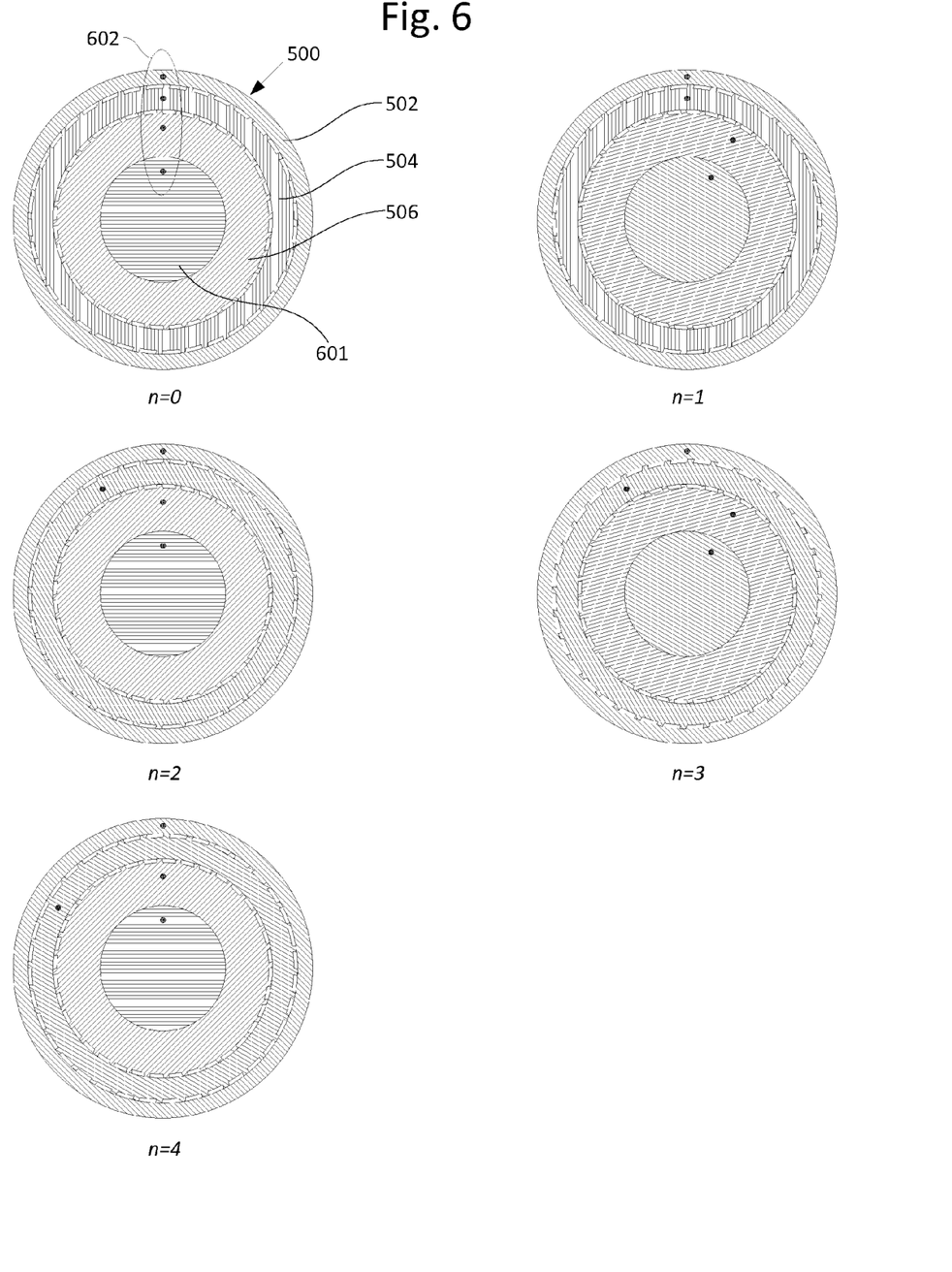
FIG. 6 depicts a bearing, according to an example embodiment.

FIG. 6 illustrates an oscillation condition for the compound bearing 500 that illustrates the walking motion of shared race 504. The representative assembly shown includes a shaft 601 fixed to the inner race 506. Tick marks 602 represent rotational positions of the outer race 502, shared race 504, inner race 506, and shaft 601, and are used for illustrative purposes only. Designations n=0 through n=4 represent successive time intervals through an oscillation cycle of the assembly. At n=0, the assembly is at an initial condition. At n=1, the shaft 601 (and correspondingly the inner race 506) have completed the first forward rotation of an exemplary 30° oscillation in a clockwise direction. Notably, in this example, shared race 504 has not moved. Alternatively, shared race 504 may move to some minimal extent in response to movement of inner race 506, as long as the angular movement of shared race 504 is less than the angular movement of inner race 506.

At n=2, the shaft 601 and inner race 506 have completed the second (i.e., return) movement of the exemplary 30° oscillation in the opposite, counter-clockwise direction. Due to the first directional jamming mechanism, the return rotation of the inner race 506 may cause the shared race 504 to rotate counter-clockwise. In the example shown the shared race 504 has moved 30°. Alternatively, shared race 504 may move to some extent less than the angular movement of inner race 506, as long as the magnitude of angular movement is greater than the shared race 504 movement in the opposite direction during the transition from n=o to n=1. In other words, the shared race 504 is biased to move preferentially in one direction over the course of an oscillation.

At n=3, the shaft 601 and inner race 506 again rotate forward 30° clockwise, while shared race 504 remains stationary in the illustrated example. At n=4, the shaft 601 and inner race 506 complete their return movement and further advance shared race 504 in its walk around the bearing. Such oscillations may be continued ad infinitum and continue to advance the shared race 504 around the bearing. In this example, a radial load placed onto the shaft during the oscillation would spread the wear along the entire perimeter of the shared race 504. Therefore, for bearing styles that include hardened surfaces and wear surfaces, in this compound configuration it would be beneficial to include wear surfaces on the shared race, and hardened surfaces on the inner and outer races in order to maximize bearing life.

In another exemplary embodiment, FIG. 7 illustrates a compound radial plain bearing 700 according to an exemplary embodiment. The bearing 700 may include a flat (e.g., cylindrical) inner race 706, an outer race 702, and a shared race 704. The inner race 706 may include an external flat (e.g., cylindrical) bearing surface 708 which may substantially conform to an inner flat (e.g., cylindrical) bearing surface 712 of the shared race 704. The shared race 704 may capture the inner race 706 by, for example, enclosing at least part of an outer periphery of the inner race 706, including the bearing surface 708. As an example, the bearing surface 712 may circumscribes a lateral (i.e., width-wise in cross-section) portion of the inner race's bearing surface 708, while still allowing the surfaces to slide against each other. In that manner, the inner race 706 may rotate radially within the shared race 704.

The shared race 704 may further include an outer flat (e.g., cylindrical) bearing surface 714. The outer race 702 may capture the shared race 704 by, for example, enclosing at least part of an outer periphery of the shared race 704, including the bearing surface 714. As an example, the outer race 702 may include an inner flat (e.g., cylindrical) bearing surface 718 that circumscribes a lateral (i.e., width-wise in cross-section) portion of the shared race's flat bearing surface 714, while still allowing the surfaces to slide against each other. In that manner, the shared race 704 may rotate radially within the outer race 702.

IV. Conclusion

The particle arrangements shown in the Figures should not be viewed as limiting. It should be understood that embodiments may include more or less of each element shown in a given Figure. Futher, some of the illustrated elements may be combined or omitted. Yet futher, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purpose of illustration and not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

I claim:

1. A spherical plain bearing, comprising:
   an inner race comprising an external convex first bearing surface;
   a shared race comprising (i) an inner concave second bearing surface circumscribing a lateral portion of the first bearing surface and in sliding disposition to the first bearing surface, and (ii) an outer flat third bearing surface;
   an outer race enclosing at least part of an outer periphery of the shared race, the outer race comprising an inner flat fourth bearing surface circumscribing a lateral portion of the third bearing surface and in sliding disposition to the third bearing surface; and
   a first directional jamming mechanism configured to allow the inner race to rotate in a first radial direction relative to the shared race and to impede rotation of the inner race relative to the shared race in a second radial direction, wherein the second radial direction is opposite to the first radial direction.

2. The bearing of claim 1, wherein the first directional jamming mechanism comprises a jamming flexure.

3. The bearing of claim 2, wherein at least a portion of the first bearing surface forms the jamming flexure.

4. The bearing of claim 1, wherein the first directional jamming mechanism comprises at least a portion of the first bearing surface configured in the form of a bias-textured surface.

5. The bearing of claim 1, further comprising a second directional jamming mechanism configured to allow the shared race to rotate in the second radial direction relative to the outer race and to impede rotation of the shared race in the first radial direction relative to the outer race.

6. The bearing of claim 5, wherein the second directional jamming mechanism comprises a jamming flexure.

7. The bearing of claim 6, wherein at least a portion of the third bearing surface forms the jamming flexure.

8. The bearing of claim 5, wherein the second directional jamming mechanism comprises at least a portion of the third bearing surface configured in the form of a bias-textured surface.

9. A spherical plain bearing, comprising:
   an inner race comprising an external flat first bearing surface;
   a shared race comprising (i) an inner flat second bearing surface circumscribing a lateral portion of the first bearing surface and in sliding disposition to the first bearing surface, and (ii) an outer convex third bearing surface;
   an outer race comprising an inner concave fourth bearing surface circumscribing a lateral portion of the third bearing surface and in sliding disposition to the third bearing surface; and
   a first directional jamming mechanism configured to allow the inner race to rotate in a first radial direction relative to the shared race and to impede rotation of the inner race relative to the shared race in a second radial direction, wherein the second radial direction is opposite to the first radial direction.

10. The bearing of claim 9, wherein the first directional jamming mechanism comprises a jamming flexure.

11. The bearing of claim 10, wherein at least a portion of the first bearing surface forms the jamming flexure.

12. The bearing of claim 9, wherein the first directional jamming mechanism comprises at least a portion of the first bearing surface configured in the form of a bias-textured surface.

13. The bearing of claim 9, further comprising a second directional jamming mechanism configured to allow the shared race to rotate in the second radial direction relative to the outer race and to impede rotation of the shared race in the first radial direction relative to the outer race.

14. The bearing of claim 13, wherein the second directional jamming mechanism comprises a jamming flexure.

15. The bearing of claim 14, wherein at least a portion of the third bearing surface forms the jamming flexure.

16. The bearing of claim 13, wherein the second directional jamming mechanism comprises at least a portion of the third bearing surface configured in the form of a bias-textured surface.

17. A radial plain bearing, comprising:
- an inner race comprising an external flat first bearing surface;
- a shared race comprising (i) an inner flat second bearing surface circumscribing a lateral portion of the first bearing surface and in sliding disposition to the first bearing surface, and (ii) an outer flat third bearing surface;
- an outer race comprising an inner flat fourth bearing surface circumscribing a lateral portion of the third bearing surface and in sliding disposition to the third bearing surface; and
- a first directional jamming mechanism configured to allow the inner race to rotate in a first radial direction relative to the shared race and to impede rotation of the inner race relative to the shared race in a second radial direction, wherein the second radial direction is opposite to the first radial direction.

* * * * *